United States Patent [19]

Thompson et al.

[11] Patent Number: 5,677,418

[45] Date of Patent: Oct. 14, 1997

[54] REFLECTIVE SELF-METALLIZING POLYIMIDE FILMS

[75] Inventors: David W. Thompson, Williamsburg, Va.; Maggie L. Caplan, Sun City West, Ariz.; Anne K. St. Clair, Poquoson, Va.

[73] Assignee: The United States of America as represented by the Administrator of the National Aeronautics and Space Administration, Washington, D.C.

[21] Appl. No.: 490,290

[22] Filed: Jun. 14, 1995

[51] Int. Cl.⁶ .......................... C08G 73/10; C08G 69/26
[52] U.S. Cl. .......................... 528/353; 524/600; 524/607; 252/506; 252/514; 252/518
[58] Field of Search .......................... 528/353; 524/600, 524/607; 252/506, 514, 518

[56] References Cited

U.S. PATENT DOCUMENTS

| | | | |
|---|---|---|---|
| 3,073,784 | 1/1963 | Endrey | 252/518 |
| 4,030,316 | 6/1977 | Aronson | 62/467 |
| 4,512,855 | 4/1985 | Mazur | 204/22 |
| 5,378,508 | 1/1995 | Castro et al. | 427/556 |

*Primary Examiner*—Samuel A. Acquah
*Assistant Examiner*—P. Hampton-Hightower
*Attorney, Agent, or Firm*—George F. Helfrich

[57] ABSTRACT

A silver organic complex, such as silver acetate, is solubilized in a polyamic acid resin or soluble polyimide solution using a suitable solvent such as hexafluoroacetyl acetone. The mixture is stable and can be applied to both flat and contoured surfaces. Application can be performed by casting, dip-coating, spraying, or other suitable techniques. In addition, the mixture can be cast or extruded as a polyimide film which is not applied to an underlying substrate. Upon curing, a flexible silver coated polyimide film is produced.

12 Claims, No Drawings

REFLECTIVE SELF-METALLIZING POLYIMIDE FILMS

The invention described herein was jointly made by employees of the United States Government and contract employees during the performance of work under NASA contracts and is subject to the provisions of Section 305 of the National Aeronautics and Space Act of 1958, as amended, Public Law 85-568 (72 Stat. 435; 42 U.S.C. 2457) and 35 USC 202 in which the contractor elected not to retain title.

BACKGROUND OF THE INVENTION

1. Field of the Invention

The invention is related to polyimide films which possess a highly reflective surface and, more particularly, to flexible films that have a highly reflective silver surface, and to compositions and methods for producing the films.

2. Description of the Prior Art

State-of-the-art polymer films with reflective surfaces are currently produced by multiple step processes which involve physically adding a reflective metal layer to the surface of an existing polymer film. This can be accomplished by sputtering, plasma deposition, and other means. These techniques are generally expensive and time consuming because they involve multiple-steps and expensive equipment, such as vacuum plasma chambers, etc. Moreover, the area of a given film which can be metallized at a given time is limited by the size of the equipment used for depositing the surface metal layer. Furthermore, the films thus produced have a less than optimum metal-polymer interface, wherein reflective metal particles which are not firmly implanted into the polymer film surface will not be retained or will be easily removed.

In past work, polyimides modified with silver additives have occasionally produced metallic surfaces (see, U.S. Pat. No. 3,073,784 to Endrey, and Auerbach, *J. Electrochem. Soc.: Accelterated Brief Comm.*, 937 (April 1984)). The surfaces of the Endrey and Auerbach films might be inferred to be reflective; however, no quantitative measurements of this property were reported in these references. U.S. Pat. No. 4,512,855 to Mazur discloses a technique of metal interlayer deposition which is used to produce reflective and conductive silver interlayers in polyimides. Mazur reports that the reflectivities of the metallized interlayers produced according to his processes were between 6% and 36%. The percent reflectivity is the measure of reflectivity compared to the reflectivity of a front surfaced optical mirror with a reflectivity coefficient of 0.92.

Silver nitrate has been used as an additive for polyamic acid solutions to produce self-metallizing polyimide films upon cure of the polymer. Silver nitrate has the advantage that it is readily soluble in polyamic acid resin compositions, whereas many other silver containing compounds have been found to be insoluble, and either cause gellation of the polymer or precipitate out of solution after being mixed with the polyamic acid resins. However, doping polyamic acid resins with silver nitrate has several disadvantages. For example, the polyimide films which are produced using the silver nitrate suffer from embrittlement. This lack of flexibility in the final silver coated film severely limits the applications in which the films can be effectively used. In addition, polyimides which have been reported as having metallized and/or reflective surfaces have as a rule been doped with silver nitrate at high concentrations (e.g., ~25% by weight). Young et al., *Macromolecules*, 25:887 (1992) have reported that silver inhibits the imidization process, thus, high concentrations of silver nitrate can lead to films with reduced thermal stability and increased polymer degradation. For these reasons, prior art highly-doped polyimide films have only found utility in decorative applications, but have never been implemented successfully in more demanding environments, such as space applications, where flexibility and thermal stability are required.

SUMMARY OF THE INVENTION

It is an object of this invention to provide a composition capable of producing flexible, thermally stable, abrasion resistant, highly reflective polyimide films.

It is another object of this invention to provide a stable composition for producing highly reflective films which can be applied to any shaped surface by spraying, dip-coating, painting, or other suitable application techniques.

It is another object of this invention to provide a reflective polyimide film that has surface reflectivities in excess of 50% when compared to a front surfaced aluminum optical mirror with a reflectivity coefficient of 0.92 at an angle of incidence of 20°.

According to the invention, complexes of silver with short chain (e.g., $C_{1-6}$) carboxylic acid moieties, are solubilized in polyamic acid precursor compositions which form aromatic condensation polyimides or are solubilized in soluble polyimide solutions, using a suitable coordinating additive such as hexafluoroacetyl-acetone (HFA) in a suitable solvent such as dimethylacetamide. The mixture is stable and can be cast to form a film or can be applied to a substrate surface via spraying, dip-coating, painting, or by other suitable means. Upon curing the mixture, silver rises to the surface of the film or coating, and forms a reflective surface which is permanently affixed to the underlying polyimide. The films thus produced are flexible, abrasion-resistant, temperature stable, and have reflectivities approaching that of an optical mirror.

DETAILED DESCRIPTION OF THE PREFERRED EMBODIMENTS OF THE INVENTION

Preparation of most commerically available polyimide films and coatings involves the room temperature reaction in a solvent of an aromatic diamine with an aromatic dianhydride to yield a polyamic acid precursor solution. To form the polyimide, a polyamic acid precursor solution is chemically or thermally imidized. Chemical imidization may be performed by combining the polyamic acid precursors with a mixture of pyridine and acetic anhydride, which reagent system is essential to catalyze the imidization and absorb the liberated water, respectively. Thermal imidization can be performed by heating to an imidization temperature which causes the condensation reaction of the carboxylic acid group with the amide group. Thermal imidization for many commercially available polyimide forming compositions typically takes place at temperatures ranging from 200° C. to 350° C., and most often in the range of 250° C. to 300° C. Heating can be performed in an oven or over a burner, but may also be performed by other means such as laser heating, etc.

A wide variety of dianhydrides and diamines can be used within the practice of the present invention. For example, the dianhydrides could include: 3,3',4,4'-benzophenonetetracarboxylic dianhydride (BTDA); 3,3',4,4'-biphenyltetracarboxylic dianhydride (BPDA); 2,2-bis(3,4-dicarboxyphenyl)hexa-fluoropropane dianhydride (6FDA); pyromellitic dianhydride (PMDA); 4,4'-oxydiphthalic dianhydride (OPDA); and 4,4'-bis(3,4-dicarboxy)diphenyl sulfide dianhydride. The dianhydrides could also be provided as the equivalent tetracarboxylic acids. The diamines could include: phenylenediamine (PDA); benzidine; 4,4'-oxydianiline (ODA); 1,3-bis (aminophenoxybenzene (APB); diaminodiphenylmethane; diaminobenzophenone; diaminodiphenylsulfone; and bis (aminophenoxy)phenylhexafluoropropane.

The above-listed dianhydrides and diamines are listed for exemplary purposes only, and it should be understood that other dianhydrides and diamines can be used within the practice of this invention. The dianhydrides and diamines can be used to prepare both polyamic acid precursor solutions which contain 1 or more dianhydrides and 1 or more diamines and solvent, or solubilized polyimide solutions which contain polyimide prepared from the polyamic acid precursors with the polyimide solubilized in a solvent. It should also be understood that precursors which include both an amine and anhydride moiety can be polymerized by condensation polymerization to produce a polyimide.

Preferably, the dianhydride and diamine are mixed together in equimolar quantities in an amide type solvent to prepare either polyamic acid precursor resins or the solubilized polyimide solutions. Suitable solvents include N,N-dimethylacetamide (DMAc), N-methylpyrolidinone (NMP), N,N-dimethylformamide (DMF), and dimethylsulfoxide (DMSO). The dianhydrides may also be present in the polyamic acid precursor solution as tetracarboxylic acid entities. Furthermore, the polyimide films formed according to this invention can be formed from solutions which contain two or more dianhydrides and two or more diamines. In this way, the properties of the polymer film can be tailored for specific applications.

In the practice of this invention, a complex of silver and an organic short chain (e.g., $C_{1-6}$) carboxylic acid moiety is solubilized in a polyamic acid precursor resin or a solubilized polyimide solution. The polyamic acid precursor solutions are preferably prepared by reacting a diamine and a dianhydride in a solvent such as DMAc; however, they are not imidized prior to the addition of the ionic silver complex. In the polyamic acid precursor solutions, the precursors are preferably present in equimolar concentrations and preferably constitute 1 to 99% by weight of the resin with the remaining weight percentage being solvent. The solubilized polyimide solution includes a pre-imidized polyimide which is solubilized with a suitable solvent such as DMAc, NMP, DMF, or DMSO. In the solubilized polyimide solution, the solubilized polyimide preferably constitutes 1 to 99% of the solution with the remaining weight percentage being solvent. Preferably, the solubilized polyimide solution is prepared by adding the imide as a powder to a suitable solvent.

Silver acetate is a specific example of the silver and $C_{1-6}$ carboxylic acid complexes which can be used in the practice of this invention. These silver and $C_{1-6}$ carboxylic acid complexes are not, by themselves, soluble in either polyamic acid precursor resins or solubilized polyimide solutions. Without a solubilizer or coordinating additive, a polyamic acid precursor solution combined with a silver organic complex will gel or the metal additiver will not dissolve. Thus, a suitable solubilizing agent or coordinating additive must be combined with the silver complex and the polyamic acid precursor solution or solubilized polyimide solution. It has been determined that fluorinated acetyl compounds, such as hexafluoroacetylacetone (HFA), trifluoroacetylacetone (TFA), and trifluoroacetic acid, can be used to dissolve or disperse silver organic complexes such as silver acetate in polyamic acid resin solutions and solubilized polyimide systems. Best results are obtained when HFA is used as the solubilizing agent. The mode of action of these fluorinated acetyl compounds is not known, but they are believed to displace the organic moiety from the silver to make a soluble entity.

The silver organic complex (calculated on the basis of silver alone) should constitute 0.001% to 20% by weight of the polyamic acid precursor solution or solubilized polyimide solution, and the solubilizing or coordinating agent for the silver organic complex should constitute 0.001% to 40% by weight of the polyamic acid precursor solution solubilized polyimide solution. Table 1 below discloses the formation of films that are 2–10% silver; however, it should be understood that the percentage of silver can be wide ranging (e.g., 0.001%–50%). Films which have higher percentages of silver will have reduced thermal properties afforded by the underlying polyimide, In preparing the films of this this invention, it has been found advantageous to combine the silver organic complex with the fluorinated acetyl solubilizing or coordinating agent in a solvent which is the same as that used in conjunction with the polyamic acid precursor solution or the solubilized polyimide solution. Subsequently, the silver solution and the polyamic acid precursor solution or solubilized polyimide solution are combined and stirred together.

The solutions thus prepared have been found to be stable. These solutions have the advantage that they can be sprayed onto a surface on which a reflective coating is desired, they can be applied to a surface using dip-coating, painting or other procedures, or they can be cast or extruded to form a film, or processed using a wide variety of other procedures. The ability to apply the solution as surface coating allows surfaces of any shape or contour to be coated and provided with a reflective silver coated film. Controlling the amount of solvent in the solution will allow control of the solution viscosity and enable a wide variety of operations to be performed.

After casting or extruding a film or forming a surface coating, the film or coating must be cured. The cure temperature will depend on the polyimide or polyimide precursors, but will generally require heating to approximately 250° C.–350° C. for a period of time. Heating can be performed in an oven, or by laser heating, or by other suitable means.

After heating, a flexible film (fingernail creasable with modulus and breakloads represented in Table 1 below) having a silver surface coating of 50 to 100 nm in thickness for a film that has a total thickness of approximately 25 μm. The reflectivities of such films are 70–80% for silver concentrations from 5–18% of the resulting cured film. The flexibility and reflectivity of the films described herein are in marked contrast to those prepared with silver nitrate which tend to be brittle and have much lower reflectivities.

In the practice of this invention, the thickness of the films produced can vary considerably. For examples, films ranging from approximately 1.5 μm to 40 μm will have similar properties.

The films produced according to this invention have a wide variety of applications. For example, the polyamic acid precursor solution can be applied to a contoured surface of a solar collector such that a contoured, reflective polyimide film is formed which can be used to direct and concetrate photon energy on a solar cell or passive solar medium. In addition, the invention has particular application in space applications wherein both flat and irregularly contoured surfaces can be provided with a highly reflective coating which can be used in space optics applications as well as protective reflective layer for an underlying part or tool coated by the highly reflective film. The reflective films may also be used in decorative film packaging applications, wherein surfaces of the packaging are made reflective for decorative purposes. Many other scientific and commercial fields, such as use as X-ray filters and in large area antennas, will also benefit from use of the above-described invention.

EXAMPLE 1

2,2-Bis(3,4-dicarboxyphenyl)hexafluoropropane dianhydride (6FDA)/1,3-bis(aminophenoxy)benzene (APB) resin was prepared by reacting 118.397 g (0.4050 moles) APB with 181.718 g (0.4090 moles) 6FDA in 1644.811 g N,N-dimethylacetamide (DMAc). Chemical imidization was performed by slowly adding 887.8 g of this resin to a stirred solution of 1070 ml each of acetic anhydride and pyridine. The imidized solution was precipitated in water and vacuum dried for three (3) hours at 300° C.

To prepare a solubilized silver additive solution, 0.0872 g (0.00052 moles) of silver acetate was mixed with 5.0048 g of DMAc and 0.1126 g (0.00054 moles) of hexafluoroacetylacetone (HFA). 0.7503 g of the 6FDA/APB powder prepared as described above was added to the stirred solution of silver acetate/DMAc/HFA. This solution was calculated to produce a cured film with 7% silver by weight. No precautions were taken to protect the silver-doped solutions from exposure to light. One film was cast 0.015 inches thick onto a glass plate. Two other films were case 0.028 inches thick onto 2"×2" plates for reflectivity measurement. One 2"×2" plate was glass and the other was stainless steel. The silver-containing soluble polyimide films were heat treated one day after combining the materials together in a forced air oven using a schedule of 1 hr each at 60° C., 100° C., 200° C., and 300° C.

The resulting films had a highly reflective silver surface and were flexible. The average of four reflectivity measurements was 77%. The highest reading was 83% reflectivity. The films thus produced had a 10% weight loss as measured by dynamic thermogravimetric analysis (TGA) in air at 363° C.

EXAMPLE 2

3,3'4,4'-Benzophenone tetracarboxylic dianhydride (BTDA)/4,4'-oxydianiline (ODA) resin was prepared by reacting 10.0054 g (0.050 moles) of ODA and 16.1635 g (0.050 moles) of BTDA with 190.76 g of DMAc. The silver additive solution was made by mixing 0.0236 g (0.00014 moles) of silver acetated and 1.0050 g of DMAc, then adding 0.0361 g (0.0017 moles) of HFA. This solution, which was calculated to make a film containing 2% silver by weight, was added to 4.9937 g of polyamic acid resin solution. No precautions were taken to prevent exposure of the silver solution to light. The doped resin was centrifuged and cast into tow films, one 0.015 inches thick and the 0.028 inches thick, the latter being the reflectivity specimen. The next day, the films were imidized by heating 1 hr at 100° C., then heating to 300° C. with a ramp time of 3 hrs, then holding for 1 hr at 300° C. The cured films posessed a reflective silver surface and were transparent. The average of three reflectivity readings was 36%.

EXAMPLE 3

A 15% solids BTDA/ODA polyamic acid resin was prepared according to Example 2, using the following amounts: BTDA-16.2289 g (0.0504 moles); ODA-10.1243 g (0.0506 moles); DMAc-191.23 g. The silver additive solution, which was calculated to make a cured film that was 4% silver, was made by mixing 0.3885 g (0.0023 moles) of silver acetate, 8.0294 g of DMAc and 0.5152 (0.0025 moles) of HFA. This was added to 40.0333 g of BTDA/ODA polyamic acid resin. The silver solution was not protected from exposure to light. Films were cast to wet thicknesses of 0.018" and 0.028" onto glass plates. The next day they were cured using the same cure schedule as in Example 2. The cured films were flexible and had a coating of reflective silver. The average reflectivity of two measurements was 55%. Mechanical testing showed that these films had a modulus of 497 ksi and a break load of 22 ksi. Dynamic TGA gave a 10% weight loss in air at 379° C. and in nitrogen at 551° C. Table 1 shows comparisons with undoped controls.

EXAMPLE 4

BTDA/ODA polaymic acid resin synthesized according to Example 3 was used. Silver dopant solution was made by minging 0.4440 g (0.0027 moles) of silver acetate and 6.0040 g of DMAc, then adding 0.601 g (0.0029 moles) of HFA. This mixture was stirred until dissolved and added to 30.1278 g of resin. No precautions were taken to protect the solution from exposure to light. The doped resin was centrifuged and two films were cast onto glass plates, one 0.016 inches thick and the other 0.028 inches thick. The films were thermally imidized one day after casting using the cure schedule of Example 2. The cured films, which were calculated to be 6% silver, were very reflective and flexible. The average reflectivity of thre measurements was 73%. Mechanical testing demonstrated that the modulus was 504 ksi and the break load was 23 ksi. Dynamic TGA's were performed in air and in nitrogen. The 10% weight loss in air was at 372° C. and in nitrogen was at 488° C. and 492° C., for two different runs. Table 1 shows how thes values compare to undoped controls.

EXAMPLE 5

BTDA/ODA polyamic acid resin from Example 3 was used. Silver dopant solution was made by mixing 0.6090 g (0.0036 moles) of silver acetate and 5.9971 g of DMAc, and then adding 1.5738 g (0.0076 moles) of HFA. This solution was added to 29.9904 g of resin and stirred. No precautions were taken to protect the silver containing solutions from exposure to light. The doped resin was centrifuged and cast as two films onto glass plates using thicknesses of 0.015 inches and 0.028 inches. The next day, the films were cured using the same cure schedule set forth in Example 2. The cured films, which were calculated to be 8% silver by weight, had very reflective silver surfaces and were flexible. Mechanical testing showed the modulus was 402 ksi and the break load was 17 ksi. Dynamic TGA's were performed in air and nitrogen. The 10% weight loss in air was at 376° C. and in nitrogen was at 491° C. Table 1 shows how these data compare to undoped control film.

EXAMPLE 6

A BTDA/ODA polyamic resin synthesized according to the procedure set forth in Example 3 was used. The silver solution was made by mixing 0.0788 g (0.00047 moles) of silver acetate with 1.0002 g of DMAc, then adding 0.1044 g (0.00050 moles) of HFA. After mixing, the silver solution was combined with 5.0555 g of the polyamic acid resin and stirred, without providing protection from light. A film was cast 0.015 inches thick onto a glass plate. The next day, the film was cured in a nitrogen atmosphere using a cure cycle of 1 hr each at 100° C., 200° C. and 300° C. The cured film, which was calculated to be 6% silver, had a reflective greenish silver surface. Postcuring the film 1 hr at 300° C. in air caused it to become more silver in appearance. The film remained flexible after postcuring. A dynamic TGA in air showed a 10% weight loss at 380° C.

TABLE 1

SILVER ACETATE-DOPED BTDA/ODA POLYIMIDE FILMS

| Percent Silver | Percent Reflectivity 20° C., 531 nm | Modulus ksi | Break load ksi | 10% wt loss TGA in air | 10% wt loss TGA in $N_2$ |
| --- | --- | --- | --- | --- | --- |
| 0 |    | 449 | 21 | 524 | 540 |
| 4 | 55 | 497 | 22 | 379 | 489 |
| 6 | 73 | 504 | 23 | 372 | 488,492 |
| 8 | 79 | 402 | 17 | 376 | 491 |

While the invention has been described in terms of its preferred embodiments, those skilled in the art will recognize that the invention can be practiced with modification within the spirit and scope of the appended claims.

We claim:

1. A composition for producing a polyimide film with a reflective surface, comprising:
   a sufficient amount of silver organic complex with a $C_{1-6}$ carboxylic acid moiety such that said silver comprises between 0.001% to 20% by weight of said film;
   a solubilizing agent for said silver organic complex selected from the group consisting of hexafluoroacetyl acetone, trifluoroethyl acetone, and trifluoroacetic acid; and
   a polyimide film forming solution selected from the group consisting of polyamic acid precursors and solubilized polyimide, said silver organic complex being dissolved or dispersed in said polyimide film forming composition with said solubilizing agent.

2. The composition of claim 1 wherein said silver organic complex is silver acetate.

3. The composition of claim 1 wherein said solubilizing agent is hexafluoroacetyl acetone.

4. The composition of claim 1 wherein said polyimide film forming solution is a polyamic acid precursor solution.

5. The composition of claim 4 wherein said polyamic acid precursors are selected from the group consisting of 3,3',4,4'-benzophenonetetracarboxylic dianhydride, 3,3'4,4'-biphenyltetracarboxylic dianhydride, 2,2-bis(3,4-dicarboxyphenyl)hexafluoropropane dianhydride, pyromellitic dianhydride, 4,4'-oxydiphthalic dianhydride, 4,4'-bis(3,4-dicarboxy)diphenyl sulfide dianhydride, phenylenediamine, benzidine, 4,4'-oxydianiline, 1,3-bis (aminophenoxybenzene, diaminodiphenylmethane, diaminobenzophenone, diaminodiphenylsulfone, and bis(aminophenoxy)phenylhexafluoropropane.

6. The composition of claim 1 wherein said polyimide film forming solution is solubilized polyimide.

7. The composition of claim 6 wherein said solubilized polyimide is prepared from polyamic acid precursors selected from the group consisting of 3,3'4,4'-benzophenonetetracarboxylic dianhydride, 3,3'4,4'-biphenyltetracarboxylic dianhydride, 2,2-bis(3,4-dicarboxyphenyl)hexafluoropropane dianhydride, pyromellitic dianhydride, 4,4'-oxydiphthalic dianhydride, 4,4'-bis(3,4-dicarboxy)diphenyl sulfide dianhydride, phenylenediamine, benzidine, 4,4'-oxydianiline, 1,3-bis (aminophenoxybenzene, diaminodiphenylmethane, diaminobenzophenone, diaminodiphenylsulfone, and bis (aminophenoxy)phenylhexafluoropropane.

8. A method for preparing a silver coated polyimide film, comprising the steps of:
   forming a film of a composition comprised of
      a sufficient amount of a silver organic complex with a $C_{1-6}$ carboxylic acid moiety,
      a solubilizing agent for said silver organic complex selected from the group consisting of hexafluoroacetyl acetone, trifluoroethyl acetone, and trifluoroacetic acid, and
      a polyimide film forming solution selected from the group consisting of polyamic acid precursors and solubilized polyimide, said silver organic complex being dissolved or dispersed in said polyimide film forming composition with said solubilizing agent polyamic acid precursors; and
   curing said film, said curing step producing a polyimide film with a reflective silver surface.

9. Method of coating a substrate with a silver coated polyimide film, comprising the steps of:
   applying to a surface of a substrate a film of a composition comprised of
      a sufficient amount of a silver organic complex with a $C_{1-6}$ carboxylic acid moiety,
      a solubilizing agent for said silver organic complex selected from the group consisting of hexafluoroacetyl acetone, trifluoroacetyl acetone, and trifluoroacetic acid, and
      a polyimide film forming solution selected from the group consisting of polyamic acid precursors and solubilized polyimide, said silver organic complex being dissolved or dispersed in said polyimide film forming composition with said solubilizing agent polyamic acid precursors; and
   curing said film, said curing step producing a polyimide film with a reflective silver surface.

10. The method of claim 9 wherein said step of applying is performed by spraying.

11. The method of claim 9 wherein said step of applying is performed by dip-coating.

12. The method of claim 9 wherein said step of applying is performed by casting.

* * * * *